United States Patent [19]

McDermott

[11] Patent Number: 4,898,108

[45] Date of Patent: Feb. 6, 1990

[54] SEED SINGULATOR FOR AGRICULTURAL PLANTER

[75] Inventor: William C. McDermott, Kansas City, Mo.

[73] Assignee: Deutz-Allis Corporation, Norcross, Ga.

[21] Appl. No.: 257,183

[22] Filed: Oct. 13, 1988

Related U.S. Application Data

[63] Continuation-in-part of Ser. No. 245,727, Sep. 19, 1988, abandoned.

[51] Int. Cl.⁴ ............................ A01C 7/04; B23Q 7/02
[52] U.S. Cl. ..................................... 111/185; 221/211
[58] Field of Search ..................... 111/34, 77; 221/211, 221/278, 266; 428/318.4, 318.6, 318.8, 319.3, 319.7, 332, 334, 339, 480, 409; 15/244.3, 244.4, 244.1

[56] References Cited

U.S. PATENT DOCUMENTS

| | | |
|---|---|---|
| 1,823,689 | 9/1931 | Kelley ............................ 15/244.1 X |
| 1,954,940 | 4/1934 | Mikel ............................. 15/244.3 X |
| 2,007,238 | 7/1935 | Anderson ........................... 15/244.4 |
| 2,539,029 | 1/1951 | Megill ............................ 15/244.1 X |
| 2,572,112 | 10/1951 | Coppe ............................. 15/244.1 X |
| 3,085,276 | 4/1963 | Swanson ............................. 15/244.1 |
| 3,999,690 | 12/1976 | Deckler ............................ 221/211 X |
| 4,074,830 | 2/1978 | Adams et al. ........................ 111/77 X |
| 4,091,964 | 5/1978 | Harrer .............................. 221/278 X |
| 4,241,849 | 12/1980 | Harrer .............................. 221/278 X |

FOREIGN PATENT DOCUMENTS

| | | | |
|---|---|---|---|
| 1029136 | 4/1958 | Fed. Rep. of Germany ..... 15/244.1 |
| 1093292 | 11/1954 | France ............................. 15/244.3 |
| 1464015 | 11/1966 | France ............................. 15/244.1 |
| 327653 | 3/1958 | Switzerland ........................ 15/244.1 |
| 716442 | 10/1954 | United Kingdom ................ 15/244.1 |

Primary Examiner—Danton D. DeMille
Attorney, Agent, or Firm—Charles L. Schwab

[57] ABSTRACT

A seed singulator for an agricultural planter uses a housing with a seed cavity to which seed and compressed air is delivered and a disc with seed pockets which, in rotating, pick up seed kernels from the seed cavity and drop them at equally spaced intervals. A wear ring prevents the rotating disc from wearing the singulator housing and a resilient air cutoff pad has radial extensions which extend between sealing surfaces on the housing and the wear ring whereby seeds are prevented from wedging between the air cutoff pad and the side walls of the groove in which the pad is installed. The trailing edge of the air cutoff pad has coplanar segments in angular relation to one another which serve to accurately space the seed when using a seed disc with multiple annular rows of seed pockets.

9 Claims, 2 Drawing Sheets

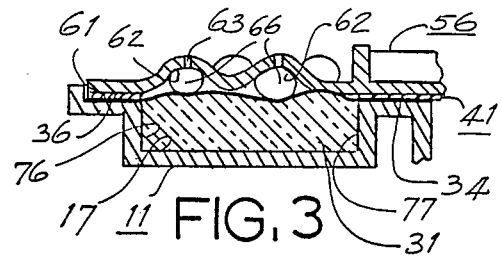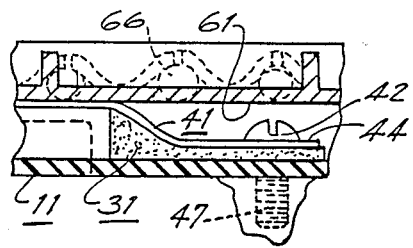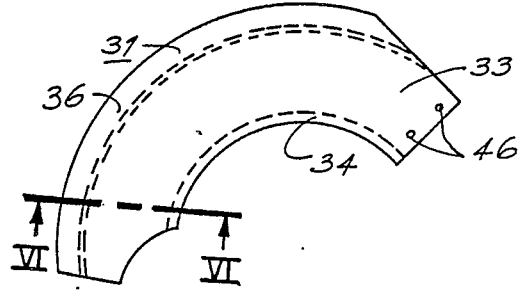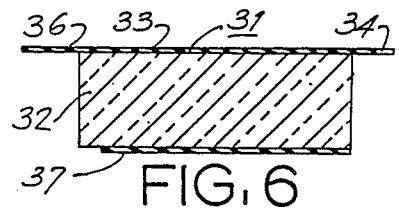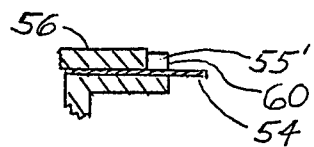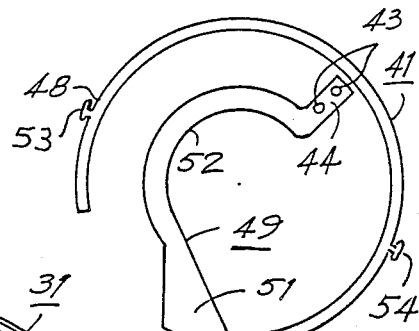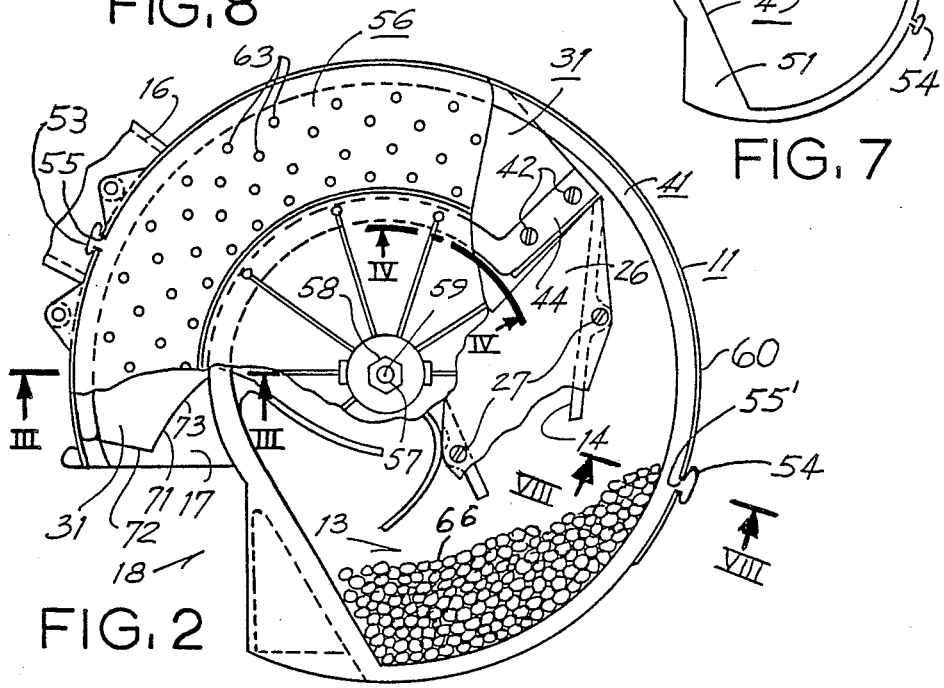

SEED SINGULATOR FOR AGRICULTURAL PLANTER

This application is a continuation-in-part of application Ser. No. 245,727, filed Sept. 19, 1988 now abandoned.

TECHNICAL FIELD

This invention relates to a seed singulator having a seed cavity subjected to compressed air which aids movement of seed kernels into pockets of a rotating disc disposed at one side of the cavity.

PRIOR ART STATEMENT

A seed singulator of the type in which the present invention is particularly useful is shown in U.S. Pat. No. 4,074,830 issued Feb. 21, 1978 to Charles E. Adams et al. for a Compressed Air Seed Planter and in U.S. Pat. No. 4,047,638 issued Sept. 13, 1977 to Paul H. Harrer et al. for a Seed Disc for an Air Planter. Resilient air cutoff pads for such compressed air singulators are shown in U.S. Pat. No. 4,091,964 issued May 30, 1978 to Paul H. Harrer for an Air Cutoff pad for an Air Planter and in U.S. Pat. No. 4,241,849 issued Dec. 30, 1980 to Paul H. Harrer for an Air Cut-off pad for an Air Planter With Seed Discharge Feature. In using seed singulators of the type shown in the beforementioned U.S. patents it has been found under certain conditions the wear of contact surfaces of the plastic singulator housing is sufficiently great to adversely affect product life. It has also been found that in some planting conditions seed kernels may become lodged between the outer radial surface of the arcuate seed pad and the radially outer side wall of the arcuate groove in which the pad is positioned, thus disrupting accurate singulation. In addition, the prior art singulator, when using a seed disc with multiple circles of seed pockets, has not always provided as accurate seed spacing as desired for some crops.

OBJECTS AND BRIEF SUMMARY OF THE INVENTION

It is a primary object of this invention to provide a singulator which has an improved service life. It is a further object of this invention to provide a planter singulator having improved planting accuracy.

The seed singulator of this invention includes a singulator housing having a seed cavity supplied with bulk seed and compressed air and a rotatably seed disc with a flat side presenting circumferentially spaced seed pockets. An arcuate seed pad groove extends between the cavity and a seed drop portion of the housing and flat sealing surfaces on the housing substantially circumscribe the cavity and include circumferentially lapped segments at opposite radial sides of the pad groove. A resilient pad has an arcuate body part positioned in the pad groove and a flat sheet bonded to a flat side of the body part which is in sealing engagement with the flat sealing side of the seed disc. A war ring is positioned between the sealing surfaces of the housing and the seed disc to prevent excessive wear of the housing.

The flat sheet of the seed pad may be made of dense plastic and may include extensions extending radially inward and radially outward from the body part of the pad. The extensions may be sandwiched between the wear ring and the housing, thereby insuring that seed kernels will not lodge between the pad and the housing. The circumferential end of the seed pad at the seed drop portion of the housing may have a seed drop edge of special configuration so as to insure even spacing of the seeds being planted by a seed disc having seed pockets arranged in concentric circles.

BRIEF DESCRIPTION OF THE DRAWINGS

One embodiment of the invention is shown in the drawings in which:

FIG. 2 is an enlarged side view of the singulator of FIG. 1 with parts broken away to show the singulator housing, sealing pad, seed disc and wear ring;

FIG. 3 is a view taken along the line III—III in FIG. 2;

FIG. 4 is a view taken along the line IV—IV in FIG. 2;

FIG. 5 is a view of the seed pad in its noninstalled condition;

FIG. 6 is a view taken along the line VI—VI in FIG. 5;

FIG. 7 is a view of the wear ring in its noninstalled condition and

FIG. 8 is a view taken along the line VIII—VIII.

DETAILED DESCRIPTION OF THE DRAWINGS

Figure 1:
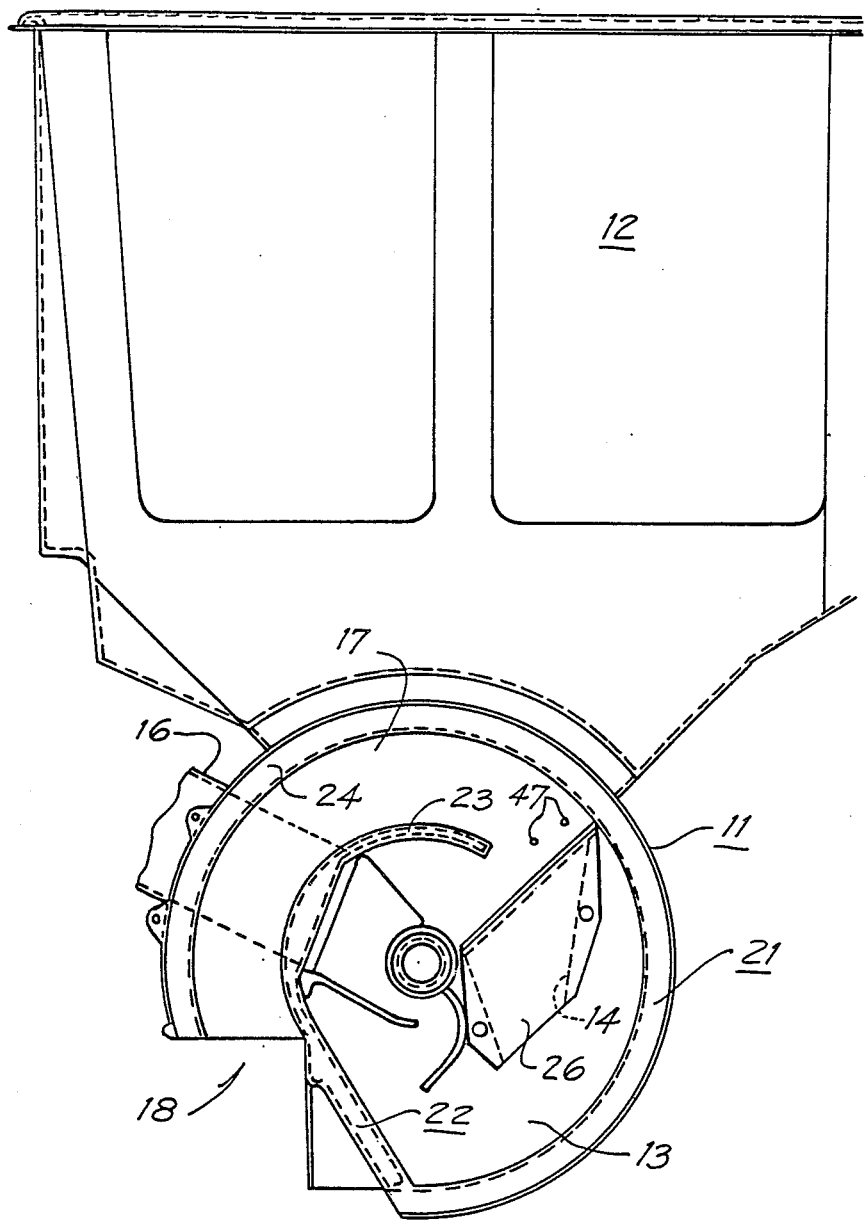
FIG. 1 is a side view of a planter singulator with parts removed.

Referring to FIG. 1, the agricultural planter in which the present invention is incorporated includes a plastic seed singulator housing 11 to which a gravity feed bulk seed hopper 12 is secured. The singulator housing 11 includes a seed cavity 13 at a lower part thereof to which the hopper 12 supplies seed through a delivery passage 14. Compressed air is supplied to the cavity 13 through an air supply passage 16. The singulator has a flat bottom arcuate pad groove 17 between the seed cavity and a seed drop portion 18. The seed cavity 13 is partially circumscribed by a first flat sealing surface 21 extending in an arc about the edge of the housing between the bottom of the cavity and the seed drop portion 18. A second flat sealing surface 22 extends from the circumferential end of the first sealing surface at the bottom of the cavity radially inward a predetermined distance and then curves in an arc segment 23. An end segment 24 of the first sealing surface 21 is in circumferentially lapped relation to the segment 23 and is separated radially by the pad groove 17. The sealing surfaces 21, 22 are coplanar.

Referring to FIG. 2, the seed inlet passage 14 is defined in part by a metal plate 26 secured to the plastic housing 11 by screws 27 to form a side wall for the passage 14. A resilient sealing pad 31 has a resilient sponge-like body 32 which is positioned in the arcuate groove 17. The sealing pad 31 is shown in its uninstalled condition in FIGS. 5 and 6 and in its installed condition in FIGS. 2, 3 and 4. A thin sheet 33 of dense plastic is bonded to the flat top surface of the arcuate body 32. The sheet 33 has extensions 34, 36 extending radially inward and radially outward relative to a horizontal axis 59 about which a disc 56 rotates and in overlying relation to the circumferentially lapping segments 23, 24 of sealing surfaces 21, 22. The sealing pad 31 also includes a bottom sheet 37 of stiff plastic bonded to the flat bottom surface of the body 32 to aid in maintaining the configuration of the body 32.

A thing flat metal wear ring 41 is shaped to cover the sealing surfaces 21, 22 of the housing. As shown in FIG.

3, the wear ring 41 in the area of segments 23, 24 of the sealing surfaces 21, 22 is in covering relation to the extensions 34, 36 of the sealing pad and thus protects them from wear. A pair of screws 42 extend through openings 43 in an offset and angled end part 44 of the wear ring 41 and through openings 46 in one end of the sealing pad 31 and into drilled and tapped openings 47 in the housing 11. The wear ring 41 includes an arcuate part 48 in covering relation to sealing surface 21 and a part 49 in covering relation to sealing surface 22. The part 49 includes a portion 51 extending radially inward from a circumferential end of the part 48 and an arcuate portion 52 in circumferentially inward lapped relation to an end portion of part 48. The part of the ring 41 not in covering relation to the extensions 34, 36 of the sealing pad are bonded, as by gluing to the sealing surfaces 21, 22. More specifically, part 51 of wear ring portion 49 and the part of portion 48 extending from part 51 to a point adjacent end part 44 are bonded to the housing 11. Upon removal of the screws 42 the sealing pad 31 may be removed (and replaced) without destroying the beforementioned bond between the wear ring 41 and the housing 11.

As shown in FIGS. 2, 7 and 8 the wear ring 41 includes a pair of index or locking tabs 53, 54 extending radially outward from diametrically opposite portions of the circumferential edge of the wear ring 41. The narrow portions of the tabs 53, 54 fit in notches 55, 55' formed in the axially extending circumferential edge or wall 60 of the housing 11. When the wear ring 41 is installed in the housing 11 the ears or enlarged portions of the tabs 53, 54 will not pass through the notches 55, 55' and thus hold the wear ring against radial movement while the narrow neck of the tabs 53, 54 engage or abut the circumferentially spaced side surfaces of the notches 55, 55' to prevent circumferential displacement of the wear ring 41. Thus, the fastening screws 42 and index tabs 53, 54 serve to hold the wear ring 41 in its proper position independently of the bonding of the wear ring 41 to the sealing surfaces 21, 22.

A seed singulating disc 56 is secured to a shaft 57 by a nut 58 and rotates counterclockwise, as viewed in FIG. 2, about a horizontal axis 59. Referring also to FIGS. 3 and 4, the seed disc includes a flat sealing face 61 in sealing contact with the wear ring 41 and the sealing pad 31. A plurality of seed pockets 62 are formed in an annular area of the seed disc 56 and by their positions define four radially spaced circles concentric with the axis 59. The pockets 62 in each circle are circumferentially spaced at equal intervals. Each pocket 62 has an air escape opening 63 at its bottom. As the disc 56 is rotated counterclockwise as viewed in FIG. 2, the pockets 62 sequentially communicate with the seed cavity where they pick up seed kernels 66 and as the pockets 62 are rotated to positions adjacent the seed pad 31 the sealing surface of the pad sheet 33 will keep the seeds in the pockets and sealingly engage the flat sealing surface 61 of the disc to cut off escape of air from the pressurized cavity 13. As the seed pocket 62 passes over the trailing edge 71 of the end of the sealing pad 31 at the seed drop portion 18 of the housing 11, the seed 66 will fall by gravity from the pocket 62 into the seed trench in the ground formed by a furrow opener, not shown. In order to achieve an equal spacing of the seeds, the end or trailing edge 71 includes end parts at right angles to the surface of sheet 33 of the sealing pad 31. The end parts junction with the sheet 33 to present edge portions 72, 73 disposed in angular relation to one another. The portion 73 is preferably arcuate. In order to further insure retention of the position of the seal pad and its trailing edge 71, the extensions 34, 36 may be bonded to the sealing surface segments 23, 24 of the sealing surfaces 21, 22.

From the foregoing description and the drawings, it is seen that the metal wear ring 41 is shaped and positioned to prevent the rotating seed disc 56 from causing wear to the housing 11 which is an expensive part to replace. The wear ring 41 also covers the extensions 34, 36 preventing their becoming worn by the rotating seed disc 56. The wear ring 41 is sandwiched between the housing and the disc, except for the offset end part 44, and the extensions 34, 36 are sandwiched between the wear ring 41 and the housing 11. The extensions 34, 36 prevent seeds from becoming wedged between the pad body 32 and the radially spaced side walls 76, 77 of the trough 17. In the event a sealing pad is used which does not include the radial extensions 34, 36 on the surface sheet 33, the wear ring 41 remains effective in preventing wear to the housing by the rotating disc 56.

The embodiments of the invention in which an exclusive property or privilege is claimed are defined as follows:

1. An agricultural planter having an air-type seed singulator including a housing with a seed cavity to which bulk seed and pressurized air are supplied and a seed drop portion at the lower part of said housing and a vertical seed singulating disc mounted for rotation about a horizontal axis having a generally flat sealing face including an annular area presenting circumferentially spaced seed pockets defining a plurality of concentric circles greater than two coaxial with said horizontal axis, said pockets sequentially communicating with said seed cavity and said seed drop portion when said disc is rotated in a predetermined direction, characterized by a first flat axially facing arcuate sealing surface extending in an arc in said predetermined direction about the outer periphery of said housing between the bottom of the seed cavity to said seed drop portion, a second flat axially facing sealing surface on said housing extending from the circumferential end of said first sealing surface at the bottom of said seed cavity radially inward relative to said horizontal axis a predetermined distance and then curving in a direction opposite to said predetermined direction to present an arcuate portion in a generally concentric and radially inward spaced relation to a part of said first sealing surface near the other circumferential end of the latter, said portion of said second sealing surface and said part of said first sealing surface forming circumferentially lapped segments, said sealing surfaces at least partially circumscribing said cavity, an arcuate trough in said housing disposed between said lapped segments, a resilient sealing pad operatively disposed within said trough, said pad having a flat surface in sealing engagement with said annular area of said seed singulating disc, said sealing pad having an end at said seed drop portion disposed at right angles to said flat surface, said end having parts disposed in angular relation to one another whereby predetermined spacing of seeds is effected during rotation of said seed disc, a generally flat wear ring secured to said housing and of a configuration to be in covering relation to said sealing surfaces, said wear ring being in axial sealing engagement with said flat sealing face of said disc and a releasable fastening member releasably securing said pad and said wear ring to said housing.

2. The planter of claim 1 wherein one of said parts of said end is curved.

3. An agricultural planter having an air-type seed singulator including a housing with a seed cavity to which bulk seed and pressurized air are supplied and a seed drop portion at the lower part of said housing and a vertical seed singulating disc mounted for rotation about a horizontal axis having a generally flat sealing face including an annular area presenting circumferentially spaced seed pockets defining at least one circle about said horizontal axis, said pockets sequentially communicating with said seed cavity and said seed drop portion when said disc is rotated in a predetermined direction, characterized by a first flat axially facing arcuate sealing surface extending in an arc in said predetermined direction about the outer periphery of said housing between the bottom of said seed cavity to said seed drop portion, a second flat axially facing sealing surface on said housing extending from the circumferential end of said first sealing surface at the bottom of said seed cavity radially inward relative to said horizontal axis a predetermined distance and then curving in a direction opposite to said predetermined direction to present an arcuate portion in a generally concentric and radially inward spaced relation to a part of said first sealing surface near the other circumferential end of the latter, said portion of said second sealing surface and said part of said first sealing surface forming circumferentially lapped segments, said sealing surfaces at least partially circumscribing said cavity, an arcuate trough in said housing disposed between said lapped segments, a resilient sealing pad operatively disposed within said trough, said pad being in sealing engagement with said annular area of said seed singulating disc, a generally flat wear ring secured to said housing and of a configuration to be in a covering relation to said sealing surfaces, said wear ring being in axial sealing engagement with said flat sealing face of said disc, an axially extending circumferential wall on said housing in surrounding relation to a substantial portion of the outer peripheral edge of that part of said wear ring which covers said first flat arcuate sealing surface, a circumferentially extending and axially open notch in said circumferential wall and an index tab on the outer periphery of said wear ring extending radially therefrom and into said notch.

4. The planter of claim 3 and further comprising at least one additional circumferentially extending and axially open notch formed in said circumferential wall and an additional index tab on said wear ring extending radially therefrom and into said additional notch.

5. The planter of claim 4 wherein said index tabs are on diametrically opposite portions of said wear ring.

6. The planter of claim 3 wherein said index tab has an enlarged portion wider than said notch lying on the radially outer side of said circumferential wall and preventing radial inward movement of said wear ring.

7. An agricultural planter having an air-type seed singulator including a housing with a seed cavity to which bulk seed and pressurized air are supplied and a seed drop portion at the lower part of said housing and a vertical seed singulating disc mounted for rotation about a horizontal axis having a generally flat sealing face including an annular area presenting circumferentially spaced seed pockets defining at least one circle about said horizontal axis, said pockets sequentially communicating with said seed cavity and said seed drop portion when said disc is rotated in a predetermined direction, characterized by a first flat axially facing arcuate sealing surface extending in an arc in said predetermined direction about the outer periphery of said housing between the bottom of said seed cavity and said seed drop portion, a second flat axially facing sealing surface on said housing extending from the circumferential end of said first sealing surface at the bottom of said seed cavity radially inward relative to said horizontal axis a predetermined distance and then curving in a direction opposite to said predetermined direction to present an arcuate portion in a generally concentric and radially inward spaced relation to a part of said first sealing surface near the other circumferential end of the latter, said portion of said second sealing surface and said part of said first sealing surface forming circumferentially lapped segments, said sealing surfaces at least partially circumscribing said cavity, an arcuate trough in said housing disposed between said lapped segments, a resilient sealing pad having an arcuate body of resilient material operatively disposed within said trough and a thin sheet of dense plastic bonded to one side of said body, said sheet being in sealing engagement with said annular area of said seed singulating disc and said sheet including an extension extending radially outward beyond said body and a generally flat wear ring secured to said housing and of a configuration to be in covering relation to said sealing surfaces, said wear ring being in axial sealing engagement with said flat sealing face of said disc and with said extension lying between said part of said first sealing surface and said wear ring.

8. The planter of claim 7 wherein said sheet includes an extension extending radially inward from said body and lying between said wear ring and said segment of said second sealing surface.

9. The planter of claim 7 wherein said wear ring is bonded to the parts of said sealing surfaces not in lapped relation to one another, said sealing pad being removable without requiring destruction of said bonded relationship between said ring and sealing surfaces.

* * * * *